United States Patent
Sweesy

[11] Patent Number: 6,129,938
[45] Date of Patent: Oct. 10, 2000

[54] CHOCOLATE-COATED BEVERAGE CONTAINER AND METHOD FOR MAKING IT

[76] Inventor: Millie Sweesy, 5582 Mossvale Cir., Huntington Beach, Calif. 92649

[21] Appl. No.: 09/281,951

[22] Filed: Mar. 31, 1999

Related U.S. Application Data

[60] Provisional application No. 60/080,408, Apr. 2, 1998.
[51] Int. Cl.$^7$ ....................................................... A23G 3/00
[52] U.S. Cl. ............................ 426/90; 426/115; 426/123; 426/394
[58] Field of Search ............................. 426/90, 103, 112, 426/115, 123, 124, 125, 132, 138, 143, 392, 394, 396, 410, 415, 420, 91, 134, 303, 306, 307

[56] References Cited

U.S. PATENT DOCUMENTS

| | | | |
|---|---|---|---|
| 1,509,194 | 9/1924 | Dresser | 426/76 |
| 1,810,453 | 6/1931 | Webster et al. | 426/5 |
| 3,824,322 | 7/1974 | Fiorella | 426/134 |

OTHER PUBLICATIONS

"Bloomingdale's 1996 Christmas Catalogue", p. 33, item H, Chocolate Covered Spoons, 1996.

*Primary Examiner*—Milton Cano
*Assistant Examiner*—Sherry A. Dauerman
*Attorney, Agent, or Firm*—Sheppard, Mullin, Richter & Hampton LLP

[57] ABSTRACT

The subject invention is a chocolate-coated beverage container and method for making it. A pull ribbon is affixed to the container over which a plastic inner sleeve comprised of shrink plastic with a tearable portion is positioned. The inner sleeve is heated to conform to the surface of the container so that the tearable portion is adjacent to the pull ribbon. Then, the container is coated with chocolate, keeping an end of the pull ribbon exposed, and the chocolate coating is cooled until it solidifies. Additionally, a transparent outer sleeve comprised of shrink plastic can be placed over the coated beverage container, and heated to conform to the surface of the chocolate coating.

11 Claims, 8 Drawing Sheets

CHOCOLATE-COATED BEVERAGE CONTAINER AND METHOD FOR MAKING IT

PRIORITY

This application claims the benefit of U.S. Provisional Application No. 60/080,408, filed Apr. 2, 1998.

BACKGROUND OF THE INVENTION

The invention relates generally to chocolate-coated beverage containers, and more particularly, to chocolate-coated beverage containers in which the chocolate can be removed with ease by the consumer.

Beverage containers can be coated with chocolate to allow for a novel and appealing product in which the chocolate and the beverage in the container can be enjoyed simultaneously and conveniently. Prior methods for coating beverage containers with a layer of chocolate involved wrapping the container with commercially available standard plastic food wrap, by placing the wrap on the container in a spiral and tapering the wrap off at the top. One disadvantage of this method has been that the thin, low-gauge plastic of which the food wrap is composed can stretch and tear as the chocolate coating is removed. This can cause the chocolate coating to spray from the container, creating an untidy and aesthetically unpleasing situation, and making consumption of the chocolate more difficult.

One attempt to rectify this problem has been to use a cylindrically-shaped plastic sleeve, with a serration extending down along the length of the cylinder. This sleeve has no plastic area to cover the base of the container; to seal off the base of the container, a suitably-sized piece of tape is applied. Making such a chocolate-coated beverage container is labor-and time-intensive, and it requires additional sections of plastic, leading to increased cost. Also, the tape sections can sometimes disengage while the container is being dipped in chocolate, leading to delay and possible interference with equipment.

There remains a need for a chocolate-coated beverage container that can be produced in an efficient manner, and that allows for easy removal of the chocolate coating. The present invention fulfills this need and provides further related advantages.

SUMMARY OF THE INVENTION

The present invention resides in an improved beverage container coated with chocolate, and to a method to produce the improved container. The containers can be manufactured with greater efficiency than containers previously known, and they allow for easier and cleaner removal of the chocolate coating by the consumer.

The process of coating begins by adhering a pull ribbon to the container, so that the ribbon runs parallel to the length of the container, extending from near the base to the neck of the container. An inner sleeve of a shrink plastic material with a sealed end and a tearable portion along its length is placed over the container, so that the tearable portion is overlaying the pull ribbon. The inner sleeve is heat-shrunk tightly and evenly to the container using a suitable heat source. The container is then coated with liquid chocolate, and the chocolate is cooled to allow it to solidify.

The chocolate-coated container may also be coated in a second layer of shrink plastic. An outer sleeve of a shrink plastic material with a sealed end is placed over the container and then shrunk tightly and evenly to the surface of the chocolate coating using a suitable heat source. The final product is a nearly full, intact shell of chocolate sandwiched between the inner and outer sleeves. The chocolate shell can be readily removed from the beverage container, thus enabling the consumer to pour the beverage easily and peel chocolate from the inner sleeve in a tidy fashion.

The chocolate optionally may be modeled by hand into various designs or blended with other chocolate flavors prior to application of the outer sleeve. Chocolate coating may also be removed prior to application of the outer sleeve, to expose the label of the beverage container. Other suitable edible coatings may also be used, such as candy glaze or caramel.

Other features and advantages of the present invention should become apparent from the following detailed description of the invention, taken with the illustrative drawings, which illustrate the principles of the invention.

DETAILED DESCRIPTION OF THE INVENTION

Figure 1:
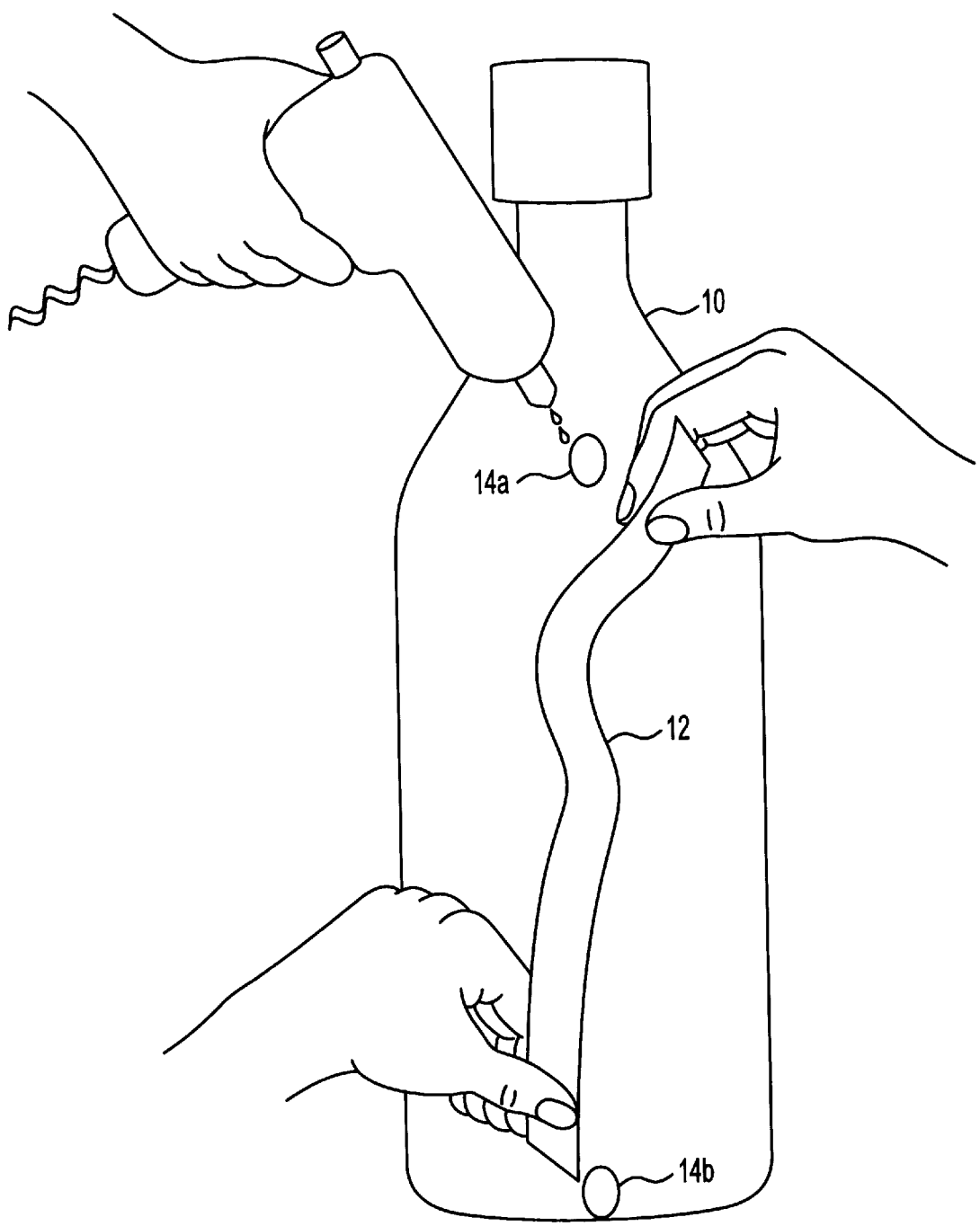
FIG. 1 is a side upright view of a beverage container to which a pull ribbon is being affixed.
Figure 2:
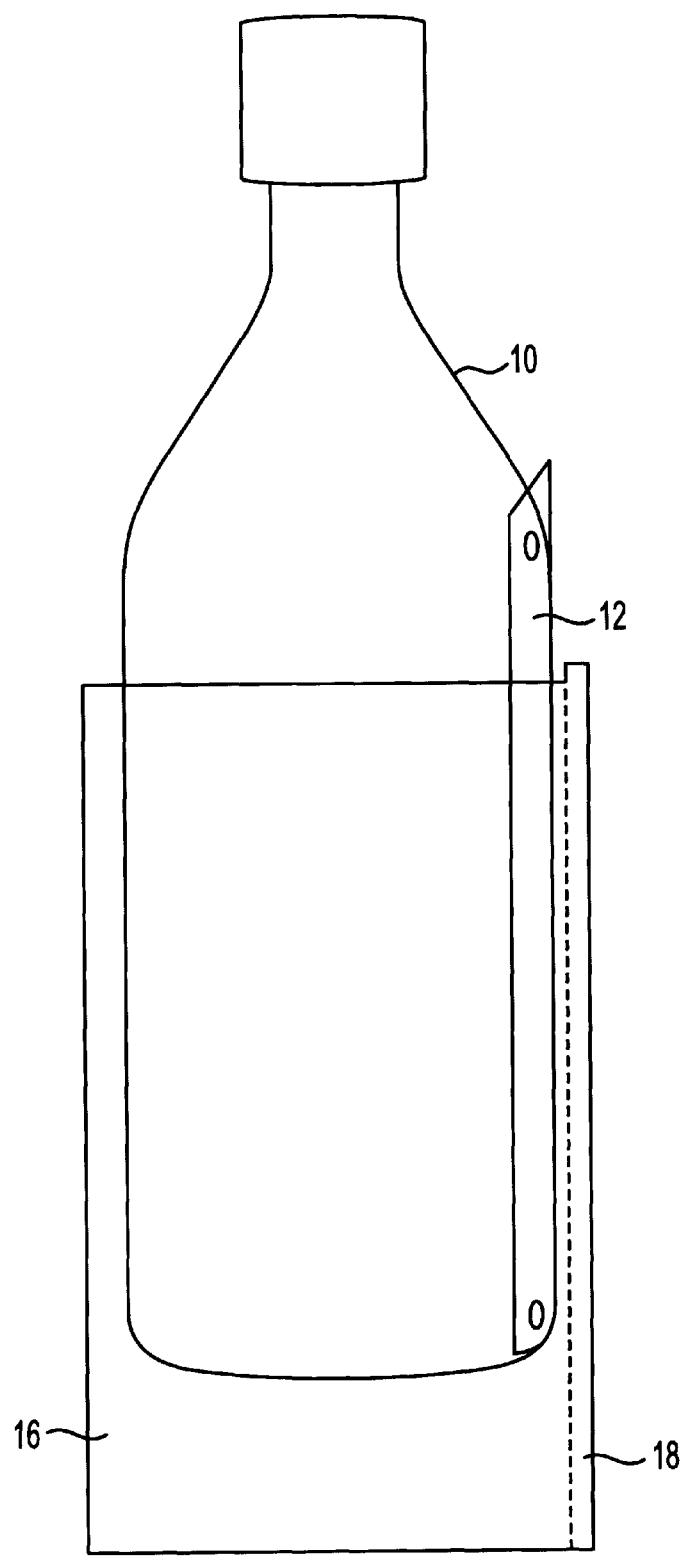
FIG. 2 is a side upright view of a serrated inner sleeve of shrink plastic material partially over a beverage container, showing the serration on the inner sleeve aligned with the pull ribbon.
Figure 3:
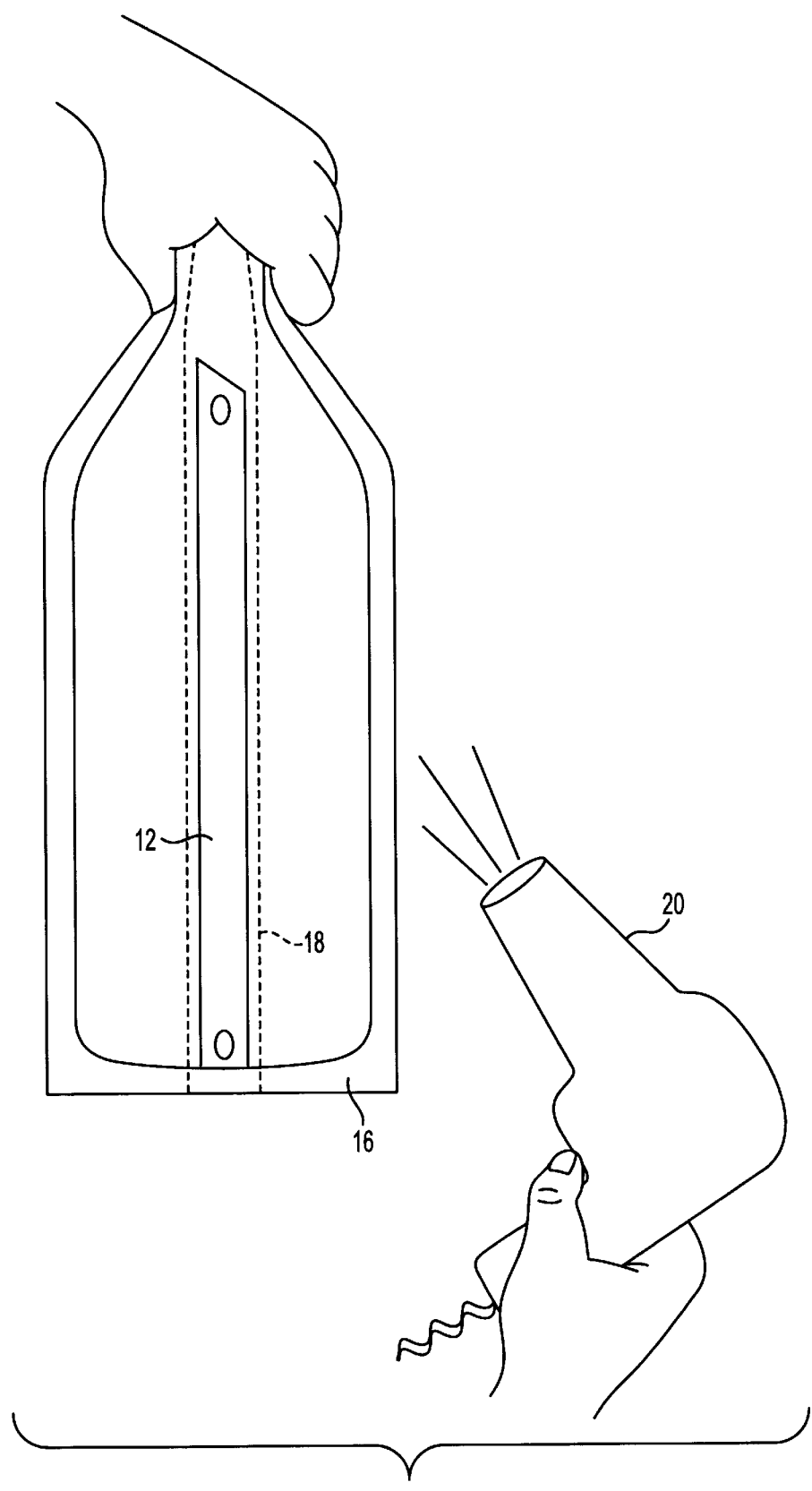
FIG. 3 is a side upright view of a beverage container completely inside an inner sleeve, as the container is gripped by its neck while heat is applied to the inner sleeve.
Figure 4:
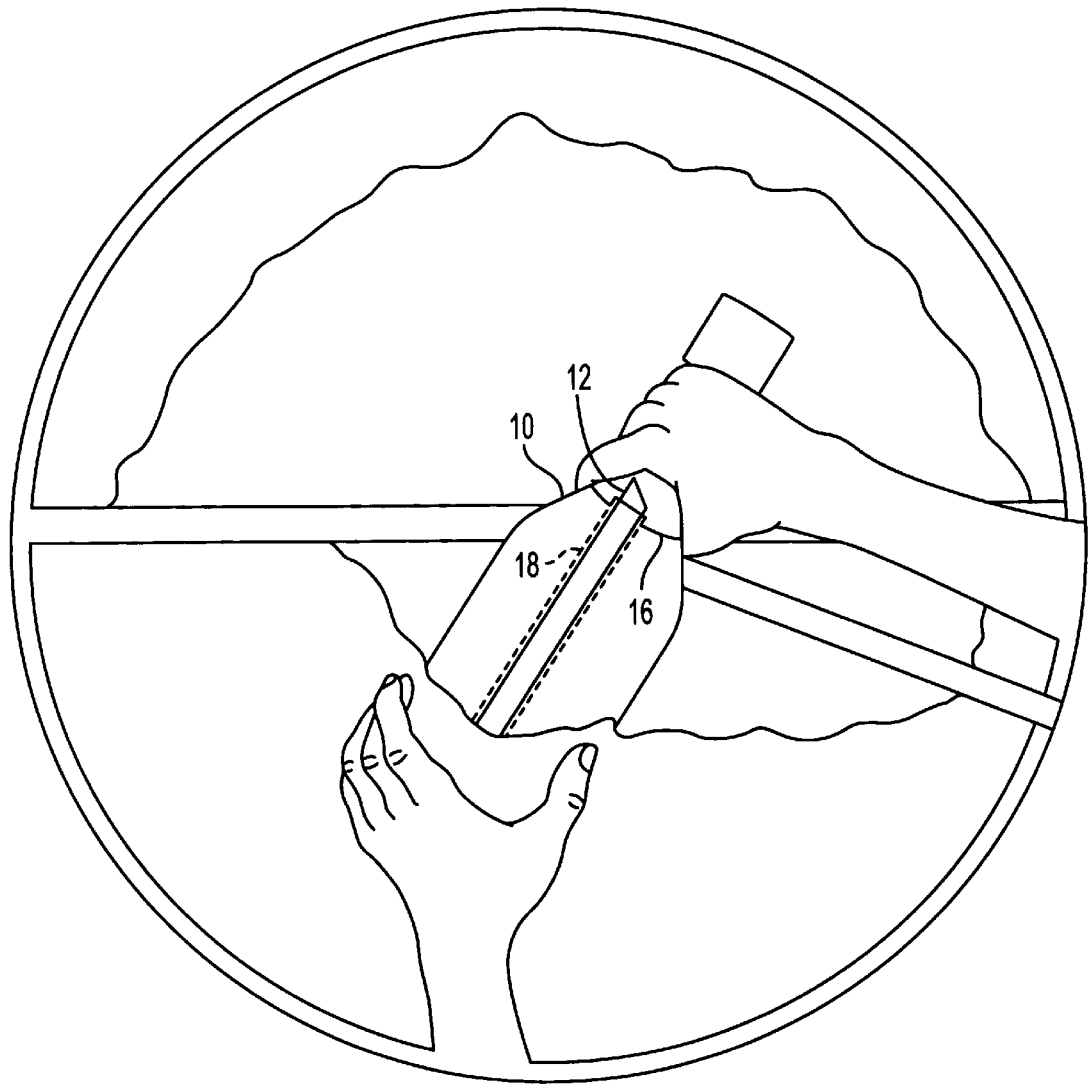
FIG. 4 is an overhead view of a beverage container after the heat-shrinking process has been completed being manually submerged to its neck in liquid chocolate for coating.
Figure 5:
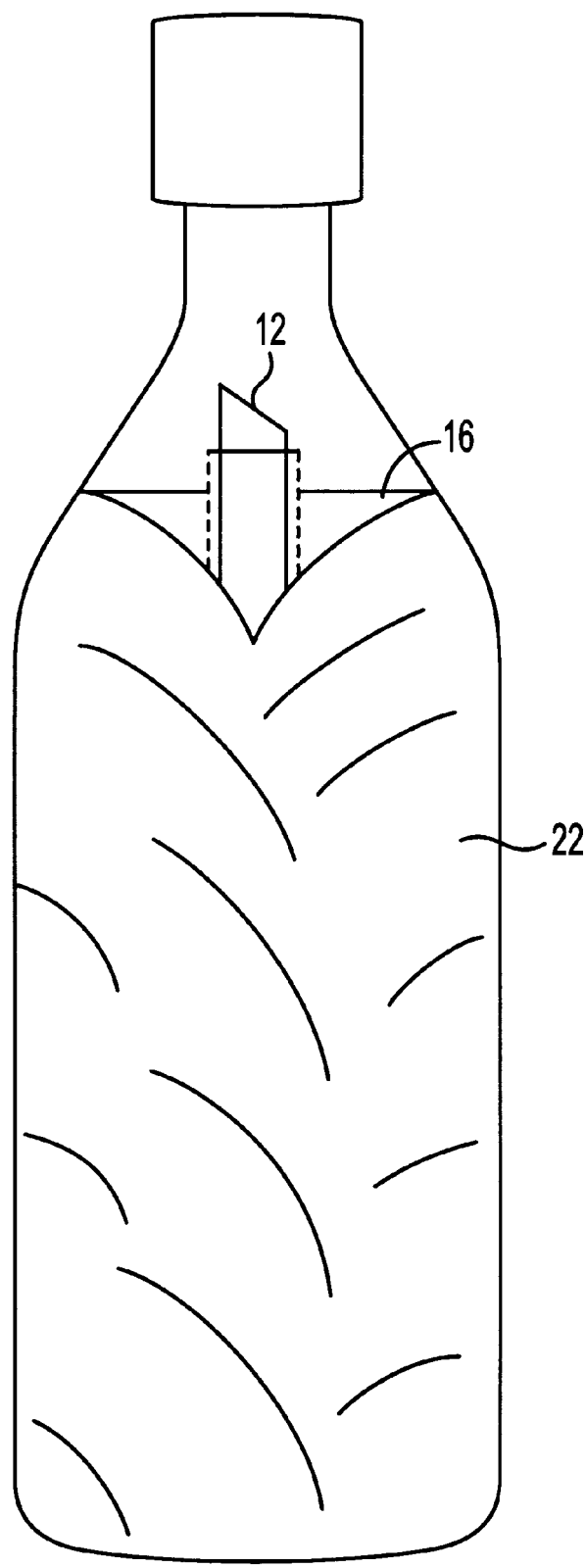
FIG. 5 is a side upright view of a chocolate-coated beverage container after the chocolate has been cooled to allow it to solidify.
Figure 6:
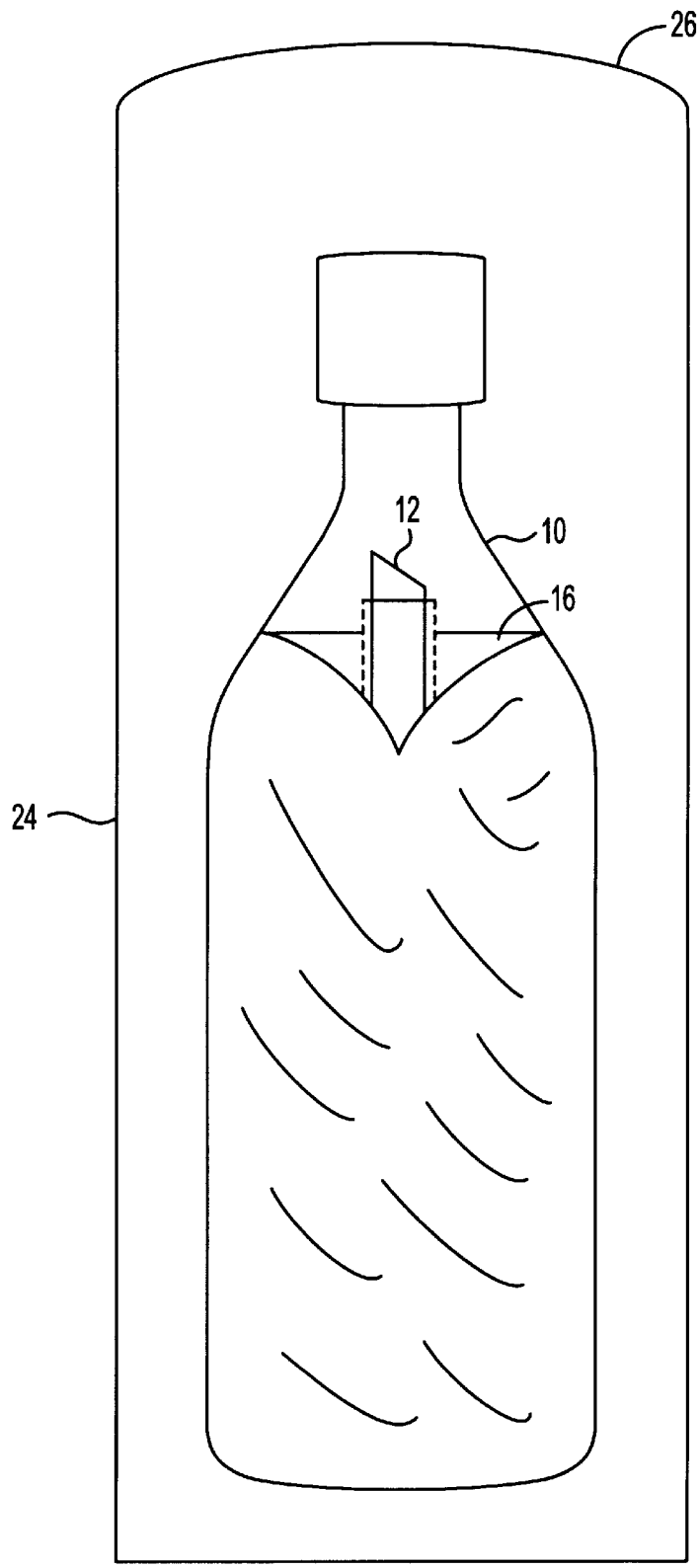
FIG. 6 is a side upright view of an outer sleeve of shrink plastic material partially over a chocolate-coated beverage container, in which the sealed end of the outer sleeve is toward the neck of the container.

The invention relates to a chocolate-coated beverage container 10, which includes a glass bottle that has a neck and a base. The container also may be any other of the standard shapes and materials for beverage containers. A pull ribbon 12 is placed on the container extending from the base up to the neck of the container, and a plastic inner sleeve 16 conforms to the surface of the container over the pull ribbon, with the end of the pull ribbon nearest the neck of the container exposed. The container has a serration 18 or other tearable portion adjacent to the pull ribbon. A coating of chocolate is disposed over the inner sleeve, leaving the end of the pull ribbon exposed. To remove the chocolate coating, the exposed end of the pull ribbon is pulled, tearing the inner sleeve along the serration and breaking the chocolate away from the inner sleeve. A transparent plastic outer sleeve 24 may also conform to the outer surface of the chocolate coating, to keep the chocolate clean prior to consumption.

The first step in coating beverage containers with chocolate is to place a pull ribbon 12 of suitable material on the side of the container 10. The preferred method of placing the pull ribbon is to affix it to the container with at least two glue drops 14a and 14b, or other suitable adhesive placed on the container such that the glue drops will be near the two ends of the pull ribbon. The pull ribbon is affixed tautly and with one end of the pull ribbon toward the base of the container, and the other end of the pull ribbon toward the neck of the container. For a 750 ml wine bottle of standard shape, this will be a pull ribbon of about 20 cm.

An inner sleeve 16 that is rectangular, with an open end, a closed end, and two side seams is placed over the container 10, so that the closed end of the inner sleeve is adjacent to the base of the container. The inner sleeve is comprised of a suitable shrink plastic material, which can be heated to conform to an adjacent surface. One suitable film is available from Traco, Manufacturing, Inc. of Orem, Utah. Adjacent to and along one of the side seams, the inner sleeve has a serration 18. Another comparable tearable portion can be substituted for this serration. The inner sleeve is then heated by a suitable heat source, such as a hand-held heat gun 20, for sufficient time to shrink the inner sleeve to conform to the surface of the container and pull ribbon, with care taken to avoid air pockets between the container and the inner sleeve. While the inner sleeve is heated, it is positioned over the container so that the serration lies over the pull ribbon 12, ensuring that when the pull ribbon is pulled on the completed container, the inner sleeve tears easily along the serration. The container and inner sleeve can be held in the desired position by holding them at the neck of the container, keeping the serration over the pull ribbon.

The container 10 is next coated in liquid chocolate up to its neck, to the edge of the inner sleeve 16, to form a "V" shape just under the upper ends of the pull ribbon 12 and serration 18. This is done by manually submerging the container in a larger container of liquid chocolate while keeping the upper end of the pull ribbon exposed to allow it to be pulled for removal of the chocolate coating. Finally, the chocolate coating is cooled to allow it to solidify. During and after this cooling period, various designs, other chocolates and imprints may be added to the coating surface, either mechanically or manually.

Figure 7:
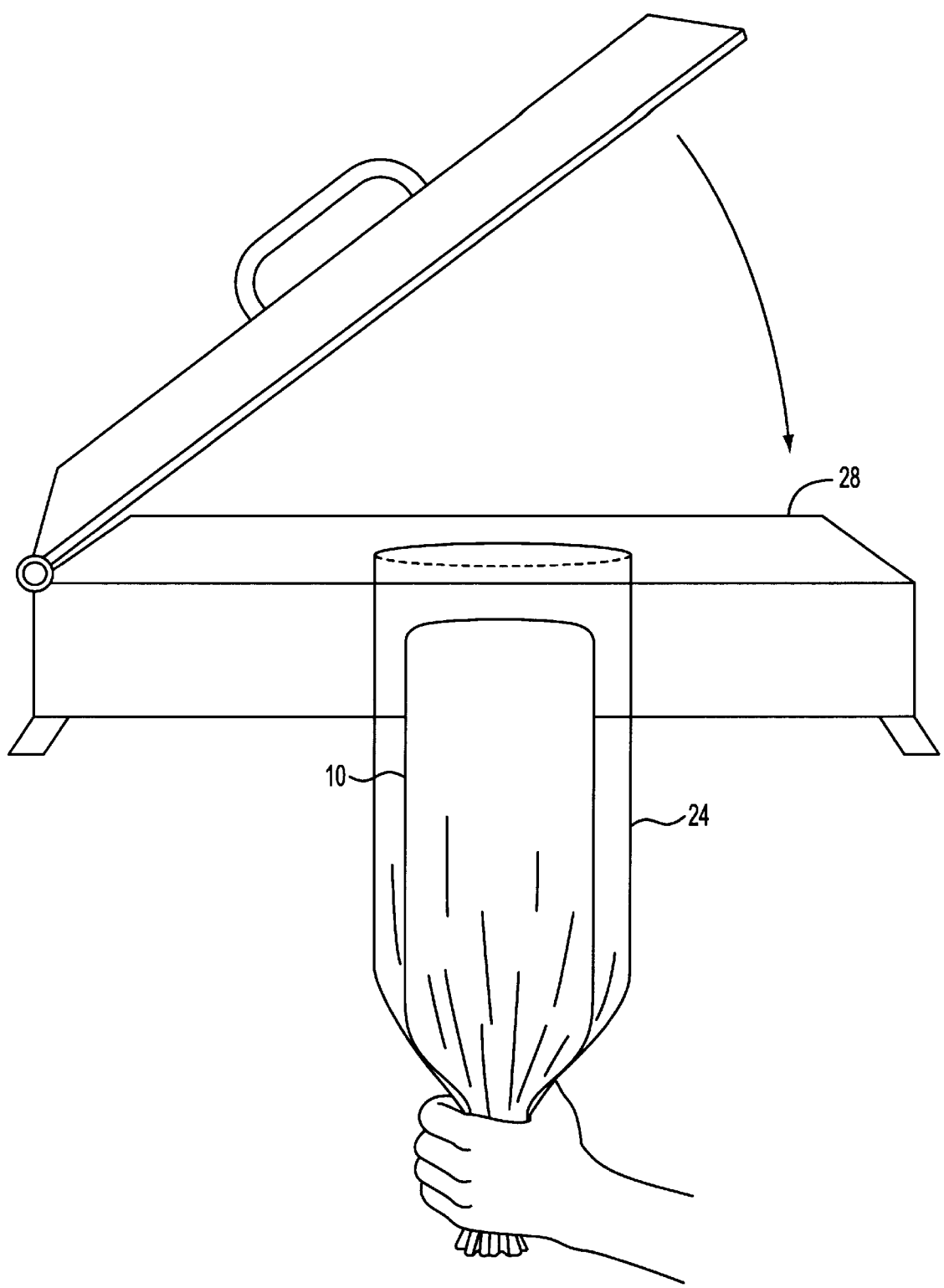
FIG. 7 is an elevational view of an outer plastic sleeve being sealed by a straight-arm sealing machine.
Figure 8:
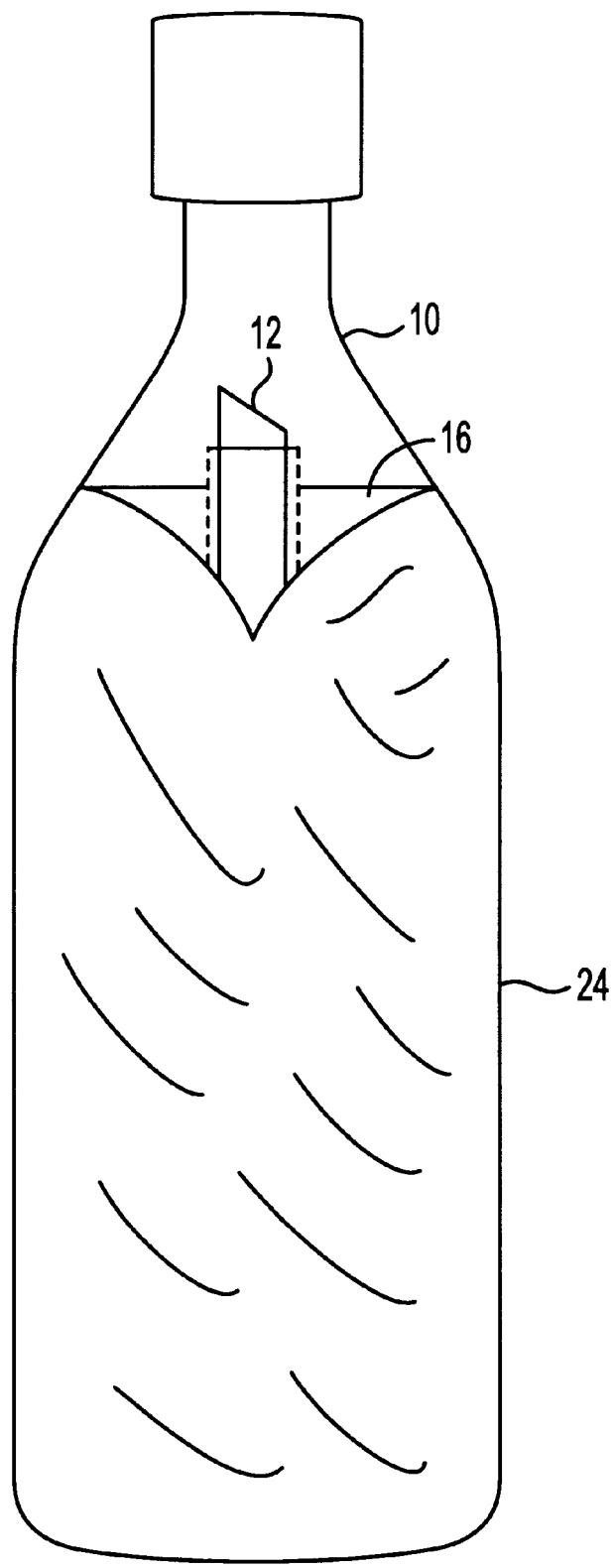
FIG. 8 is a side upright view of the chocolate-coated beverage container after heat has been applied to the outer sleeve.

A plastic transparent outer sleeve 24 can be placed over the outer surface of the chocolate coating to keep the chocolate clean until it is consumed. The outer sleeve preferably is composed of the same shrink plastic material as is the inner sleeve 16. The outer sleeve includes a sealed end 26 that is placed over the chocolate-coated beverage container 10, from the container's neck end such that an unsealed end of the sleeve is located adjacent to the container's base end. The unsealed end is sealed using a conventional plastic sealing machine 28, as shown in FIG. 7, and is placed over the chocolate-coated beverage container 10. Heat is then applied evenly to the outer sleeve, from a suitable heat source, e.g., a hand-held heat gun 20, until the outer sleeve shrinks to conform to the outer surface of the melted chocolate.

To consume the chocolate, the consumer first removes the outer layer of shrink plastic, if present, then pulls the exposed end of the pull ribbon. This causes the inner layer of shrink plastic to tear along the serration, releasing the chocolate coating in a controlled, clean manner. As the chocolate is eaten, the consumer pulls on the ribbon to tear further along the serration and release more chocolate. The chocolate peels easily and cleanly, at a rate determined by the consumer.

Although the invention has been disclosed in detail with reference only to the preferred embodiments, those skilled in the art will appreciate that additional or substitute steps of coating a beverage container with chocolate can be made without departing from the scope of the invention. Accordingly, the invention is defined only by the following claims.

I claim:

1. A method for making a chocolate-coated beverage container, comprising the steps of:

affixing a pull ribbon on the beverage container;

placing an inner sleeve having one open end and formed of shrink plastic over the beverage container and pull ribbon, with a tearable portion of the sleeve overlaying the pull ribbon, with the end of the pull ribbon being exposed;

heating the inner sleeve sufficient to conform the inner sleeve to the surface of the beverage container;

applying liquid chocolate to the beverage container to form a chocolate coating on the side of the inner sleeve facing away from the beverage container while leaving one end of the pull ribbon exposed; and cooling the chocolate coating sufficiently to allow the coating to solidify.

2. A method as defined in claim 1, and further comprising the steps of:

placing an outer sleeve formed of shrink plastic over the beverage container and chocolate coating;

sealing an open end of the outer sleeve; and heating the outer sleeve sufficient to conform the outer sleeve to the outer surface of the chocolate coating.

3. A method as defined in claim 2, wherein the steps of heating the inner sleeve and heating the outer sleeve are performed using a hand-held heat gun.

4. A method as defined in claim 1, wherein the step of placing the pull ribbon on the beverage container includes a step of applying an adhesive to the beverage container in sufficient quantity to affix the pull ribbon to the beverage container.

5. A method as defined in claim 4, wherein the step of placing the pull ribbon affixes one end of the pull ribbon at a base of the beverage container and the other end at a neck of the beverage container.

6. A method as defined in claim 1, wherein:

the tearable portion of the inner sleeve placed over the beverage container in the step of placing is a serration; and the step of placing places the serration directly over the pull ribbon.

7. A method as defined in claim 1, wherein the step of applying liquid chocolate to the beverage container includes a step of manually grasping the beverage container and submerging it in a container of liquid chocolate.

8. A chocolate-coated beverage container, comprising:

a beverage container having a base and a neck;

a pull ribbon located adjacent and connected to the beverage container and extending from the container's base to its neck;

an inner plastic sleeve conformingly overlaying the beverage container and pull ribbon, with the end of the pull ribbon located adjacent the container's neck being exposed, wherein the inner plastic sleeve includes a tearable portion overlaying the pull ribbon; and a chocolate coating disposed over the inner sleeve.

9. A beverage container as defined in claim 8, and further comprising a transparent outer plastic sleeve conformingly overlaying the chocolate coating.

10. A beverage container as defined in claim 8, wherein the tearable portion of the inner plastic sleeve is a serration.

11. A chocolate-coated beverage container, comprising:

a beverage container having a base and a neck;

a pull ribbon affixed to the beverage container with an adhesive and extending from the base to the neck;

an inner plastic sleeve conformingly overlaying the beverage container and pull ribbon, with the end of the pull ribbon located adjacent the neck being exposed, wherein the inner plastic sleeve includes a serration overlaying the pull ribbon;

a chocolate coating disposed over the inner sleeve; and a transparent outer plastic sleeve conformingly overlaying the chocolate coating.

\* \* \* \* \*